United States Patent Office 3,130,175
Patented Apr. 21, 1964

3,130,175
POLYURETHANE PLASTICS
Julius Peter, Odenthal, Karl-Ludwig Schmidt, Leverkusen, and Herbert Bartl, Cologne-Stammheim, Germany, assignors to Farbenfabriken Bayer Aktiengesellschaft, Leverkusen, Germany, a corporation of Germany
No Drawing. Filed July 13, 1960, Ser. No. 42,477
Claims priority, application Germany July 18, 1959
5 Claims. (Cl. 260—45.4)

This invention relates to rubber-like polyurethane plastics and more particularly to improved substantially nonporous rubber-like polyurethane plastics and an improved process for the preparation thereof.

The preparation of substantially nonporous polyurethane plastics by a process which involves reacting an organic polyisocyanate with a compound containing terminal hydroxyl groups such as, for example, an hydroxyl polyester or polyhydric polyalkylene ether to obtain a storable prepolymer which may be vulcanized with organic peroxides is well known. The resulting products are substantially insoluble in organic solvents and have good resistance, to low temperatures as well as other desirable mechanical properties. However, some organic peroxides have an offensive odor which can be detected in the resulting polyurethane plastic. Furthermore, the processing of the storable polyurethane prepolymers with organic peroxides is often difficult.

It is, therefore, an object of this invention to provide improved polyurethane plastics and an improved method for the preparation thereof which do not suffer from these disadvantages. Another object of this invention is to provide an improved method of vulcanizing a storable polyurethane prepolymer with an organic peroxide. Still another object of this invention is to provide improved polyurethane plastics which have been vulcanized with organic peroxides. A further object of this invention is to provide improved additives in addition to organic peroxides to cause the vulcanization of polyurethane prepolymers. A further object of this invention is to provide an improved process for the curing of polyurethane millable gums which have terminal —NCO groups. Another object of this invention is to provide on improved method for making polyurethanes which are suitable for making rubber-like articles such as vehicle tires and the like.

The foregoing objects and others which will become apparent from the following description are accomplished in accordance with the invention, generally speaking, by providing polyurethane plastics obtained from a polyurethane prepolymer comprising the reaction product of an organic polyisocyanate and an organic compound having a molecular weight of at least about 800 and containing at least two active hydrogen containing groups as determined by the Zerewitinoff method and an organic peroxide in the presence of an ethylenically unsaturated compound containing at least two ethylenic unsaturations. Thus, this invention contemplates improved polyurethane plastics and an improved process for the preparation thereof from polyurethane prepolymers obtained from organic polyisocyanates and organic compounds containing at least two active hydrogen containing groups as determined by the Zerewitinoff method. The improved process involves vulcanization of these prepolymers with organic peroxides and ethylenically unsaturated organic compounds containing at least two polymerizable ethylenic unsaturations. In other words, these compounds contain at least two carbon to carbon double bonds which are capable of entering into polymerization reactions.

Any suitable compound of this type may be used including aromatic compounds which contain at least two vinyl groups such as, for example, divinyl benzene, trivinyl benzene and the like; esters of polyhydric alcohols with olefinically unsaturated carboxylic acids such as ethylene glycol dimethacrylate; esters of polybasic acids with unsaturated alcohols such as polydiallyl ester of phthalic acid, o-silicic, tetra-allyl ester, polytriallyl ester of phosphoric acid and the like; olefinically unsaturated polyethers such as diallyl and triallyl ethers of glycerine, tetra-allyl and hexa-allyl ethers of tetra- or hexa-methylol melamine, hepta-allyl saccharose; urethanes obtained from organic polyisocyanates and ethylenically unsaturated alcohols such as the diurethane obtained from 2,4-toluylene diisocyanate and allyl alcohol and the like; ethylenically unsaturated polyesters derived from alkylene glycols such as ethylene glycol and ethylenically unsaturated dicarboxylic acids such as methyl, maleic acid, fumaric acid and the like; triacrylyl perhydro-S-triazine; triallyl cyanurate and the like. Monomeric compounds containing two or three ethylenic unsaturations, —C=C—, preferably conjugated or at least separated by one or more carbon atoms are preferred.

Any suitable amount of these compounds may be used but it is preferred to employ them in amounts less than about 10 percent by weight based on the weight of the polyurethane prepolymer. At least about 0.5 percent by weight of the ethylenically unsaturated compound should be used and for best results it is preferred to employ from about 1 percent to about 5 percent by weight based on the weight of the prepolymer of the organic compound containing at least two ethylenic unsaturations in conjunction with the organic peroxides. The greatest benefit of the invention is obtained by using ethylenically unsaturated compounds which have at least three ethylenic unsaturations. The most preferred single compound is triallyl cyanurate.

Any suitable organic compound containing at least two active hydrogen containing groups as determined by the Zerewitinoff method and having a molecular weight of at least about 800 may be used in accordance with the process of the present invention for reaction with either an excess or a deficiency of an organic polyisocyanate to prepare storable polyurethane prepolymers suitable for further modification with organic peroxides to prepare vulcanized polyurethane plastics. These compounds preferably have terminal —OH groups or —NH$_2$ groups. Compounds with a molecular weight above about 800 must be used and it is preferred to use compounds which have a molecular weight above about 1000 and preferably those having a molecular weight within the range of from about 1000 to about 5000 and hydroxyl numbers within the range of from about 25 to about 600 and acid numbers below about two. Suitable compounds of this type are, for example, hydroxyl polyesters, polyhydric polyalkylene ethers, polyhydric polythioethers, polyacetals and the like. Any suitable hydroxyl polyester may be used such as those obtained, for example, from the condensation of a polycarboxylic acid with a polyhydric alcohol. It is preferred to employ substantially linear polyesters obtained from glycols and dicarboxylic acids. Any suitable polyhydric alcohol may be used such as, for example, ethylene glycol, propylene glycol, 1,4-butane diol, trimethylol propane, pentaerythritol and the like. Any suitable polycarboxylic acid may be used such as, for example, adipic acid, succinic acid, phthalic acid, terephthalic acid, 1,3,5-benzene tricarboxylic acid and the like.

Any suitable polyhydric polyalkylene ether may be used such as, for example, those obtained by the condensation of an alkylene oxide either alone or together with a polyhydric alcohol. Any suitable alkylene oxide may be used such as, for example, ethylene oxide, propylene oxide, butylene oxide, amylene oxide and the like as well as epihalohydrins such as epichlorohydrin and aralkylene oxides such as styrene oxide and the like. Any suitable polyhydric alcohol may be used such as those more particularly set forth above for use in the preparation of the polyester. It is preferred to use polyalkylene ether glycols such as, for example, polybutylene glycol, polypropylene glycol, polyethylene glycol and the like. The polyhydric polyalkylene ethers may be prepared by any suitable process such as that disclosed by Wurtz in 1859, Encyclopedia of Chemical Technology, vol. 7, pp. 257–262, published by Interscience Publishers, Inc., 1951, and in U.S. Patent 1,922,459.

Any suitable polyhydric polythioether may be used such as, for example, that obtained by the condensation of thiodiglycol with itself or with an alkylene oxide or polyhydric alcohol as set forth above.

Any suitable polyacetal may be used such as, for example, those obtained by condensing butanedioxyethyl glycol or diethylene glycol with formaldehyde.

Any suitable organic polyisocyanate may be used but it is preferred to employ an organic diisocyanate with the above-mentioned difunctional compounds so that a substantially linear prepolymer is obtained. Examples are, diphenylmethane 4,4'-diisocyanate, 2,4-toluylene diisocyanate, 2,6-toluylene diisocyanate, 1,-naphthylene diisocyanate, hexamethylene diisocyanate, p-phenylene diisocyanate, m-phenylene diisocyanate, diphenyl sulphone 4,4'-diisocyanate and the like.

In addition to the organic compound containing at least two active hydrogen containing groups and having a molecular weight above about 800, it is possible to use additional compounds of the same type including monomeric compounds which have a molecular weight below about 800. In fact, the organic compound having a molecular weight above about 800 may preferably be used with up to equal molar parts of an organic compound having a molecular weight below about 800. Examples of compounds which may be used for this purpose are 1,4-butane diol, 1,4-butene diol, 1,4-butine diol, 3,3'-dichlorodiamino diphenylmethane, o-dichlorobenzidine, N-dioxyethyl-β-naphthylamine as well as the adduct of 1,4-butene diol with anthracene. These additional organic compounds containing active hydrogen containing groups also preferably having —OH groups or —NH$_2$ groups. They may be mixed with the higher molecular weight organic compound and reacted with the organic polyisocyanate in a single step or they may be reacted with the reaction product of an excess of an organic polyisocyanate with one of the higher molecular weight organic compounds.

The ratio of the —NCO groups to the hydroxyl groups in the preparation of the polyurethane prepolymer may be varied over a wide range to produce a storage stable product suitable for further vulcanization with an organic peroxide and the ethylenically unsaturated compound of the invention. It is preferred to prepare the prepolymer from organic polyisocyanates and compounds containing active hydrogen containing groups of the class set forth above at —NCO:—OH ratios within the range of from about 0.9:1 to about 1.2:1. The range between 1:1 and 1.1:1 gives the best results and is therefore most preferred. Of course, the ratio of —NCO to —OH is adjusted to produce a prepolymer which can be processed by the rubber processing equipment, i.e. after reaction of the organic polyisocyanate with the organic compound containing active hydrogen containing groups the resulting prepolymer should be capable of being molded, sprayed, milled, stirred or the like to incorporate the organic peroxide and the ethylenically unsaturated compound to bring about vulcanization.

Vulcanization of the polyurethane prepolymer is achieved in accordance with the invention by stirring into the prepolymer a small amount of an organic peroxide and the above-defined compound containing at least two ethylenically unsaturated linkages. It is preferred to carry out the vulcanization of the polyurethane prepolymer on a rubber mill at a temperature above about 80° C. while employing from about 0.5 percent by weight to about 10 percent by weight of an organic peroxide based on the weight of the polyurethane prepolymer in the presence of from about 0.5 percent to about 10 percent by weight of the above-described ethylenically unsaturated compounds. It is preferred to operate at elevated temperatures preferably between about 120° C. and about 160° C. and subsequently press the mixed components until they appear cured in a mold. Usually from about 15 minutes to about 12 hours is required to effect curing.

Any suitable organic peroxide may be used such as, for example, dicumyl peroxide, benzoyl peroxide, cyclohexanone hydroperoxide, methylethylketone peroxide, cumene hydroperoxide, diacetyl peroxide, succinyl peroxide and the like. Dicumyl peroxide has been found to be particularly advantageous and is preferred. Additional organic peroxides are disclosed in German patent specification 1,051,491.

If desired, fillers such as, for example carbon black or silica as well as lubricants such as, for example stearic acid, may be added to the polyurethane prepolymer on the rubber mill in addition to the above-described organic peroxides and ethylenically unsaturated compounds.

The polyurethane plastics obtained in accordance with this invention are highly vulcanized and exhibit better flexibility at low temperatures with less tendency toward crystallization and show a lower permanent deformation and elongation while demonstrating higher elasticity and higher modulus. It is also possible in accordance with the process of the present invention to obtain products using dicumyl peroxides as the vulcanizing agent which have reduced odor of cumene since less of the organic peroxide is required to cause vulcanization of the product. Still further, it is possible in accordance with the process of the present invention to produce vulcanizates from polyurethane prepolymers which heretofore could only be insufficiently vulcanized to produce satisfactory solid elastomeric rubber-like material.

The products obtained in accordance with the process of the invention are useful for the preparation of various articles where synthetic rubber has been used heretofore including the production of vehicle tires, gear wheels, accumulation bladders and the like.

The invention is further illustrated by the following examples in which the parts are by weight unless otherwise indicated.

*Example 1*

Production of the polyurethane mass employed as starting material:

About 1000 grams of an adipic acid-ethylene glycol polyester (—OH number about 56 and acid number about 1) are dehydrated for about half an hour at about 130° C. in vacuo. About 15 grams of 1,4-butane diol are added, the mixture is thoroughly stirred and about 167 grams of 4,4'-diphenylmethane diisocyanate are introduced. The temperature rises to approximately 140–145° C. The mixture is stirred until completely homogeneous, whereupon it is poured into a sheet metal box and heated for about 24 hours at approximately 100–110° C.

A storable polyurethane mass is obtained which has a Defo value of approximately 1200/30 (according to DIN 53514).

Two mixtures are prepared from the polyurethane mass thus obtained on a rubber mixing roller in approximately the following proportions.

(a)

100 parts of polyurethane mass
20 parts of ISAF carbon black
2.4 parts of dicumyl peroxide (100%)

(b)

100 parts of polyurethane mass
20 parts of ISAF carbon black
2.4 parts of dicumyl peroxide (100%)
3 parts of triallyl cyanurate The mixtures are vulcanized for about 30 minutes at about 150° C. under a press. Vulvanizates are obtained which have the following mechanical properties:

|  | (a) | (b) |
|---|---|---|
| Strength_____kg./cm.² | 320 | 320 |
| Elongation_____percent | 550 | 350 |
| Modulus at 300%_____kg./cm.² | 100 | 240 |
| Shore hardness_____degrees | 60 | 65 |
| Elasticity_____percent | 43 | 48 |

*Example 2*

A storable polyurethane mass is prepared as described in Example 1 from approximately the following parts of the named components:

1000 parts of adipic acid-propylene glycol polyester (—OH number about 56),
15 parts of 1,4-butane diol, and
116 parts of hexamethylene diisocyanate.

The mass has a Defo value at 80° C. of 190/11 (according to DIN 53514).

The following mixtures are prepared from the mass thus obtained.

|  | (a) | (b) | (c) | (d) |
|---|---|---|---|---|
| Polyurethane mass | 100 | 100 | 100 | 100 |
| ISAF carbon black | 30 | 30 | 30 | 30 |
| Dicumyl peroxide | 2 | 1.2 | 0.6 | 1.2 |
| Triallyl cyanurate | 3 | 3 | 3 | 1.5 |

After vulcanization as described in Example 1, a material is obtained which has the following mechanical properties:

|  | (a) | (b) | (c) | (d) |
|---|---|---|---|---|
| Strength_____kg./cm.² | 162 | 174 | 165 | 176 |
| Elongation_____percent | 295 | 340 | 515 | 500 |
| Modulus at 300%_____kg./cm.² |  | 152 | 95 | 96 |
| Shore hardness_____degrees | 59 | 57 | 57 | 54 |
| Elasticity_____percent | 47 | 40 | 38 | 40 |
| Permanent Elongation____do | 3 | 4 | 13 | 7 |

*Example 3*

A storable polyurethane mass is prepared as described in Example 1 from approximately the following parts of the named components:

1000 parts of adipic acid-ethylene glycol polyester (—OH number about 56), and
140 parts of dicyclohexyl methane-4,4'-diisocyanate.

Using this starting material, the following mixtures are prepared, the approximate amounts being given in parts by weight.

|  | (a) | (b) |
|---|---|---|
| Polyurethane mass | 100 | 100 |
| Carbon black CK3 | 20 | 20 |
| Dicumyl peroxide | 2 | 2 |
| Triallyl cyanurate | 0 | 3 |

After vulcanization as described in Example 1, materials are obtained which have the following mechanical properties:

|  | (a) | (b) |
|---|---|---|
| Strength | Vulcanizate which cannot be measured.) | 175 kg./cm.² |
| Elongation |  | 245% |
| Shore hardness |  | 67° |
| Elasticity |  | 36% |
| Permanent elongation |  | 3% |

It is to be understood that any other suitable organic compound having a molecular weight above 800 or below 800, organic polyisocyanate, organic peroxide or ethylenically unsaturated compound could have been used in the preceding working examples in accordance with the foregoing disclosure and that these examples are only for the purpose of illustrating the invention.

Although the invention has bene described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the preparation of a polyurethane plastic by a process which comprises vulcanizing a polyurethane prepolymer comprising the reaction product of an organic polyisocyanate with a member selected from the group consisting of an hydroxyl polyester obtained from an excess of a polyhydric alcohol and a polycarboxylic acid, a polyhydric polyalkylene ether, a polyhydric polythioether and a polyacetal with an organic peroxide the improvement which comprises vulcanizing said prepolymer with an organic peroxide in the presence of triallyl cyanurate.

2. A process for the preparation of a polyurethane plastic which comprises mixing in a first step an organic polyisocyanate with an hydroxyl polyester obtained by a process which comprises condensing an excess of a polyhydric alcohol with a polycarboxylic acid in such proportions that an —NCO:—OH ratio between about 0.9:1 and about 1.2:1 is present to prepare a prepolymer and vulcanizing said prepolymer in a second step with an organic peroxide in the presence of from about 0.5 percent to about 10 percent by weight of triallyl cyanurate based on the weight of said prepolymer.

3. The process of claim 2 wherein said organic polyisocyanate is a diphenylmethane diisocyanate.

4. The process of claim 2 wherein said organic peroxide is a dicumyl peroxide.

5. In a process for the preparation of a polyurethane plastic which comprises vulcanizing a polyurethane prepolymer, said prepolymer obtained by reacting an organic polyisocyanate with a polymeric organic compound capable of reacting with a polyisocyanate to form a polyurethane, said organic compound having only terminal alcoholic hydroxyl groups as the sole reactive moiety, said organic compound having a molecular weight of at least about 800, the resulting prepolymer composition being substantially free from ethylenic unsaturation, the improvement which comprises reacting with said prepolymer an organic peroxide and triallyl cyanurate.

References Cited in the file of this patent

UNITED STATES PATENTS

| 2,431,921 | Cook et al. | Dec. 2, 1947 |
| 2,906,738 | Goldberg | Sept. 29, 1959 |
| 2,910,456 | Gooreynd et al. | Oct. 27, 1959 |

FOREIGN PATENTS

| 828,718 | Great Britain | Feb. 24, 1960 |